Patented Apr. 28, 1925.

1,535,953

UNITED STATES PATENT OFFICE.

IRA J. SHIPMAN, OF MIDWEST, WYOMING.

CARBON REMOVER.

No Drawing.   Application filed March 25, 1924.   Serial No. 701,868.

*To all whom it may concern:*

Be it known that I, IRA J. SHIPMAN, a citizen of United States, residing at Midwest, in the county of Natrona and State of Wyoming, have invented new and useful Improvements in Carbon Removers, of which the following is a specification.

The present invention relates to a carbon remover, which is suitable for removing carbon and similar deposits from internal combustion engines and the like, and which is also suitable for removing carbon deposits from kerosene, gasoline, gas, gas oil or crude oil burners.

In preparing the composition, I mix together tallow, sulphur and alcohol, preferably in the proportions of 65 parts of tallow and 32 parts of sulphur, the tallow first being heated up sufficiently to produce a substantially molten mixture into which the sulphur is thoroughly stirred, preferably in the form of a fine powder, such as flowers of sulphur. I then cool the material down until it has substantially solidified or has reached the stage of a rather thick paste, into which I add about three parts of alcohol with the quantities of the other materials above stated. While I have described in the above specific example, certain proportions, I do not restrict myself thereto, but the proportions can be substantially varied from those given.

I then thoroughly mix the composition and put it up into suitable boxes or receptacles for sale.

For cleaning an internal combustion engine, one of the spark plugs can be removed, preferably after the engine has been run so that the engine is in a heated condition. I then insert a small amount of the material, then replace the spark plug and then run the engine for a while, until it ceases producing any considerable amount of smoke, which shows that the cylinder in which the material was placed has been cleaned, and the next cylinder can then be treated in the same manner, and so on, until all of the cylinders have been cleaned. The amount to be used in each cylinder can vary between wide limits. One tenth ounce has been found sufficient in many cases, and in other cases one third ounce has been found to give satisfactory results.

It is preferable that the engine be first heated up, by running the same in the usual manner, before introducing the carbon remover.

If the engine is provided with priming cups, a small amount of the material can be introduced into each of the cylinders, preferably one at a time, through the priming cup, and the engine operated in the manner above referred to.

The composition is found to be efficient in its operation and to readily and quickly remove the carbon from the engine, without the necessity of taking the engine apart.

Where alcohol is referred to, ordinary alcohol (ethyl alcohol) is intended, and this can be employed in the form of common denatured alcohol.

I claim:

1. A composition of matter suitable for use as a carbon remover, containing a large amount of tallow, a smaller amount of sulphur and a still smaller amount of alcohol.

2. A carbon remover consisting of about 65% of tallow, about 32% of sulphur and about 3% of alcohol.

In testimony whereof I affix my signature.

IRA J. SHIPMAN.